US012679340B2

(12) United States Patent
Holler et al.

(10) Patent No.: US 12,679,340 B2
(45) Date of Patent: Jul. 14, 2026

(54) VEHICLE AND METHOD FOR CARRYING OUT A PARKING MANEUVER

(71) Applicant: Schaeffler Technologies AG & Co. KG, Herzogenaurach (DE)

(72) Inventors: Lukas Holler, Nuremberg (DE); Andreas Woellner, Nuremberg (DE); Christian Harkort, Erlangen (DE); Tobias Molls, Forchheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/571,227

(22) PCT Filed: May 3, 2022

(86) PCT No.: PCT/DE2022/100334
§ 371 (c)(1),
(2) Date: Dec. 16, 2023

(87) PCT Pub. No.: WO2022/262890
PCT Pub. Date: Dec. 22, 2022

(65) Prior Publication Data
US 2024/0278773 A1      Aug. 22, 2024

(30) Foreign Application Priority Data
Jun. 18, 2021      (DE) ..................... 10 2021 115 823.0

(51) Int. Cl.
*B60W 30/06*          (2006.01)
*B62D 15/02*          (2006.01)

(52) U.S. Cl.
CPC ......... *B60W 30/06* (2013.01); *B62D 15/0285* (2013.01)

(58) Field of Classification Search
CPC .... B60K 17/34; B60K 17/356; B60K 17/358; B60W 30/06; B62D 11/04; B62D 15/0285; B62D 7/1509; B62D 9/00
See application file for complete search history.

(56) References Cited

U.S. PATENT DOCUMENTS

| | | | | | |
|---|---|---|---|---|---|
| 2,822,214 A | * | 2/1958 | Rivolta | ..................... | B62D 1/18 |
| | | | | | 280/775 |
| 3,666,034 A | * | 5/1972 | Stuller | ................... | B60K 17/10 |
| | | | | | 180/242 |

(Continued)

FOREIGN PATENT DOCUMENTS

| | | | | |
|---|---|---|---|---|
| DE | 102015209843 A1 | 12/2016 | | |
| DE | 102019119719 | * 2/2021 | ............... | B62D 7/06 |

*Primary Examiner* — Carl C Staubach
(74) *Attorney, Agent, or Firm* — Davidson Kappel LLC

(57) ABSTRACT

A vehicle and method for a parking maneuver includes an electrically operated vehicle, having two axles with two drive and chassis modules which are spaced apart by a track width are arranged on each of the axles, and, on the basis of a straight-head position in the longitudinal direction of the vehicle, each of the drive and chassis modules has a separate maximum steering angle with respect to a side of the vehicle and having a control device in which a plurality of steering functions for actuating a steering angle of the drive and chassis modules are configured and stored. A method for carrying out a parking maneuver, in which the drive and chassis modules are adjusted synchronously in accordance with one of the steering functions.

20 Claims, 6 Drawing Sheets

(56) References Cited

U.S. PATENT DOCUMENTS

| | | | | |
|---|---|---|---|---|
| 5,014,802 | A * | 5/1991 | Knoll | B62D 7/159 |
| | | | | 180/408 |
| 8,630,770 | B2 * | 1/2014 | Matsumoto | B62D 7/1509 |
| | | | | 701/41 |
| 9,834,249 | B2 * | 12/2017 | Ishikawa | B62D 3/12 |
| 11,279,402 | B2 * | 3/2022 | Cecchin | B62D 7/09 |
| 2004/0195013 | A1 * | 10/2004 | Spark | B62D 9/00 |
| | | | | 180/6.24 |
| 2010/0116572 | A1 * | 5/2010 | Schmitt | B62D 9/002 |
| | | | | 701/22 |
| 2013/0098695 | A1 * | 4/2013 | Itou | B60K 17/356 |
| | | | | 180/211 |
| 2016/0068183 | A1 * | 3/2016 | Matsuoka | B60L 15/025 |
| | | | | 701/41 |
| 2019/0329819 | A1 * | 10/2019 | Shan | B62D 5/12 |
| 2022/0024268 | A1 * | 1/2022 | Wuebbolt-Gorbatenko | |
| | | | | B60G 17/015 |

* cited by examiner

VEHICLE AND METHOD FOR CARRYING OUT A PARKING MANEUVER

CROSS-REFERENCE TO RELATED APPLICATIONS

This application is the U.S. National Phase of PCT Appl. No. PCT/DE2022/100334 filed May 3, 2022, which claims priority to DE 10 2021 115 823.0, filed Jun. 18, 2021, the entire disclosures of which are incorporated by reference herein.

TECHNICAL FIELD

The present disclosure relates to a vehicle, in particular electrically operated, having two axles, with two drive and chassis modules spaced apart by a track width being arranged on each of the axles, and a method for carrying out a parking maneuver.

BACKGROUND

With the emergence of electric vehicles and the ongoing development of driver assistance systems, new overall vehicle concepts are increasingly coming into focus, one of which is the concept of the so-called people mover for urban spaces or for large self-sufficient infrastructure areas, such as airports or exhibition centers. Part of this concept is that the vehicles are characterized by high maneuverability in the movement area assigned to them. From a technical point of view, this high degree of maneuverability is achieved by compact wheel suspensions or integrated drive and chassis modules, by which the wheel can be set to a large turning angle or steering angle—on both sides in relation to a straight-ahead position—in the longitudinal direction of the vehicle. This allows maneuvers such as "turning on the spot", "sideways travel" or "crab walking" to be performed by the vehicle. Wheel suspension modules are known in the prior art, for example from DE 10 2019 119 719 A1.

SUMMARY

However, due to the large turning angle or steering angle, an increased installation space is required in the wheel arch of the vehicle to accommodate the wheel suspension module, with this installation space requirement ultimately coming at the expense of the vehicle interior and restricting it. The usually structurally complex design of such wheel suspension modules for vehicles with the described maneuverability requirements is associated with considerable additional costs. A vehicle regularly has four wheel suspension modules; it is a two-track vehicle with two axles. Currently, the wheel suspension modules of a vehicle are designed symmetrically with respect to the turning angle or steering angle, as a so-called symmetrical chassis. A symmetrical design means, in relation to the longitudinal direction of the vehicle, a maximum turning angle or steering angle of the wheel suspension modules of an axle that is the same to opposite sides of the vehicle. In relation to the wheel suspension modules, however, this means that each module must be designed specifically for the vehicle side assigned to it. At best, it is possible to provide identical wheel suspension modules on the second axle when viewed in the diagonal direction. Ultimately, this means that two side-dependent wheel suspension modules must be installed and the installation space in the wheel arch must also be adapted to the module located there.

From a cost perspective, it would therefore be advantageous to be able to further simplify the side-dependent wheel suspension modules and in particular to be able to design the installation space in each wheel arch box in a uniform and simplified manner. However, such a configuration requires special attention to the possible parking maneuvers, which must still correspond to the requirements profile of such a vehicle.

On this basis, an object of the present disclosure is to provide a simplified configuration of the wheel suspension modules while implementing a variety of relevant parking maneuvers.

One embodiment relates to a vehicle, in particular electrically operated, having two axles, with two drive and chassis modules spaced apart by a track width being arranged on each of the axles and each of the drive and chassis modules having, proceeding from a straight-ahead position in the longitudinal direction of the vehicle, a first maximum steering angle to a first vehicle side and a second maximum steering angle to a second vehicle side, and a control device in which a plurality of steering functions for controlling a steering angle of the drive and chassis modules are configured and stored and which sets the steering angle of the drive and chassis modules according to the presence of an intended parking maneuver by performing one of the steering functions.

A vehicle having a plurality of identical drive and chassis modules can therefore be provided, since all the modules can be rotated to the same vehicle side up to the same maximum steering angle. This results in an identical installation space requirement for each wheel arch in which the module is accommodated, which therefore has to be optimized and designed once. This results in a cost-saving common-part strategy when the vehicle is later built.

If you look at the entire vehicle, an asymmetrical steering angle range can be achieved in relation to its longitudinal direction, meaning that all drive and chassis modules can be rotated to one of the two vehicle sides up to a maximum steering angle and can be rotated to the other of the two vehicle sides up to a different, larger or smaller maximum steering angle. In combination with suitable measures for the wheelbase and track width of the overall vehicle concept, a high degree of maneuverability can be achieved while at the same time reducing design complexity. Owing to the same steering angle range for all drive and chassis modules, adjacent components can be better accommodated in the chassis, such as control arms, cables and a sensor system.

The design of the overall vehicle concept for an asymmetrical steering angle range provides advantages in terms of maneuverability in particular if it is decided at concept level that, in relation to straight-ahead travel in the longitudinal direction of the vehicle, there is a preferred vehicle side for intended parking maneuvers or to which side the parking maneuvers are carried out. Proceeding from a preferred vehicle side, most or all parking maneuvers would then be carried out in the corresponding preferred direction. The choice when deciding on the preferred direction follows, for example, from whether there is right-hand traffic or left-hand traffic in the driving area of the vehicle, i.e. whether one gets out of or into a vehicle almost exclusively on the right roadside or on the left roadside.

Of course, driving maneuvers or parking maneuvers are also conceivable in which the right and left drive and chassis modules are set to different steering angles although to the same vehicle side. This is possible because each of the modules has its own actuator that can be controlled independently.

Each drive and chassis module can have a drive arrangement, which in turn includes a motor apparatus. The motor apparatus is designed to generate a drive torque for driving a wheel and to transmit the drive torque to it. For example, the motor apparatus is designed as an electric motor.

Each drive and chassis module can have a chassis arrangement. The chassis arrangement includes at least one axle control arm. The at least one axle control arm is designed to guide the wheel relative to a vehicle frame or chassis. The chassis arrangement and the drive arrangement are preferably compactly combined in a module in that the motor apparatus is integrated into the chassis arrangement on the frame side.

The vehicles within the meaning of this application are non-track-bound, self-propelled land vehicles. The vehicle is designed, for example, as a passenger car or truck.

In a preferred embodiment of the present disclosure, the first maximum steering angle is larger than the second maximum steering angle, with the magnitude being taken into account in the present case. This allows the maneuverability to be adapted to the application. In particular, a steering angle that is too large for the application can be avoided in order to subsequently avoid unnecessary design effort.

In a particularly preferred embodiment of the present disclosure, the angular range between the first maximum steering angle and the second maximum steering angle is 135°. In a specific embodiment, it is possible, proceeding from the straight-ahead position, for the first maximum steering angle to be 90° and the second maximum steering angle to be 45°. By adjusting the steering angle within these limits, a large number of parking maneuvers can be performed, such as parallel parking while moving, parallel parking and unparking in a crab walk, or changing from sideways travel to straight-ahead travel without stopping.

An object is further achieved by a method for carrying out a parking maneuver with a vehicle as described above, in which the drive and chassis modules are synchronously set in accordance with one of the steering functions to a current steering angle between the first and the second maximum steering angle or to one of the maximum steering angles. The synchronous setting of all modules is advantageous in terms of control technology, for which the individual servomotors can be easily calibrated as a basis. This calibration can be continuously checked via an end stop control.

According to a preferred embodiment of the method, the steering functions represent at least one parking maneuver in which the control device sets the drive and chassis modules between the straight-ahead position and the first maximum steering angle via one of the steering functions while the vehicle continues to move. This makes it advantageously possible, with a previously defined preferred direction, for the vehicle to park into a parallel parking space or unpark out of this parking space without having to stop in the meantime, i.e. without an intermediate stop. The parallel parking space is disposed in the preferred direction in relation to the longitudinal direction of the vehicle. Continued vehicle movement is preferably achieved when the vehicle can carry out the parking maneuver, or at least a significant part of a maneuver, without stopping.

In a specific embodiment of the method, setting of the drive and chassis modules between the straight-ahead position and the first maximum steering angle can be used to park the vehicle in the parallel parking space using a forward travel movement and to unpark the vehicle from the parallel parking space using a reverse travel movement.

According to a further preferred embodiment of the method, a parking procedure is followed by an unparking procedure and, while the vehicle continues to move, the drive and chassis modules are set between the second maximum steering angle and the straight-ahead position. The vehicle can also move out of the parallel parking space with a forward travel movement. In a specific embodiment, it is possible for the steering function between the parking procedure and the unparking procedure to set the drive and chassis modules from the first maximum steering angle to the second maximum steering angle. In this case also, all drive and chassis modules are preferably synchronized. This period can be used, for example, to change passengers.

In general, in the parking maneuvers described, the lateral vehicle movement that the vehicle must carry out in order to get from the road into the parking space on the side of the road takes place using cornering and/or a crab walk.

In an alternatively preferred embodiment of the method, the lateral travel movement of the vehicle takes place using a purely sideways travel of the vehicle. For this purpose, a steering function represents a parking maneuver which comprises a parking procedure and a subsequent unparking procedure, and the steering function sets the drive and chassis modules from the straight-ahead position to the first maximum steering angle during the parking maneuver and sets them back into the straight-ahead position during the unparking procedure.

BRIEF SUMMARY OF THE DRAWINGS

In the following, the present disclosure is explained by way of example with reference to the accompanying drawings using preferred exemplary embodiments, wherein the features presented below can present an aspect of the present disclosure both individually and in combination. In the drawings.

DETAILED DESCRIPTION

Figure 1:
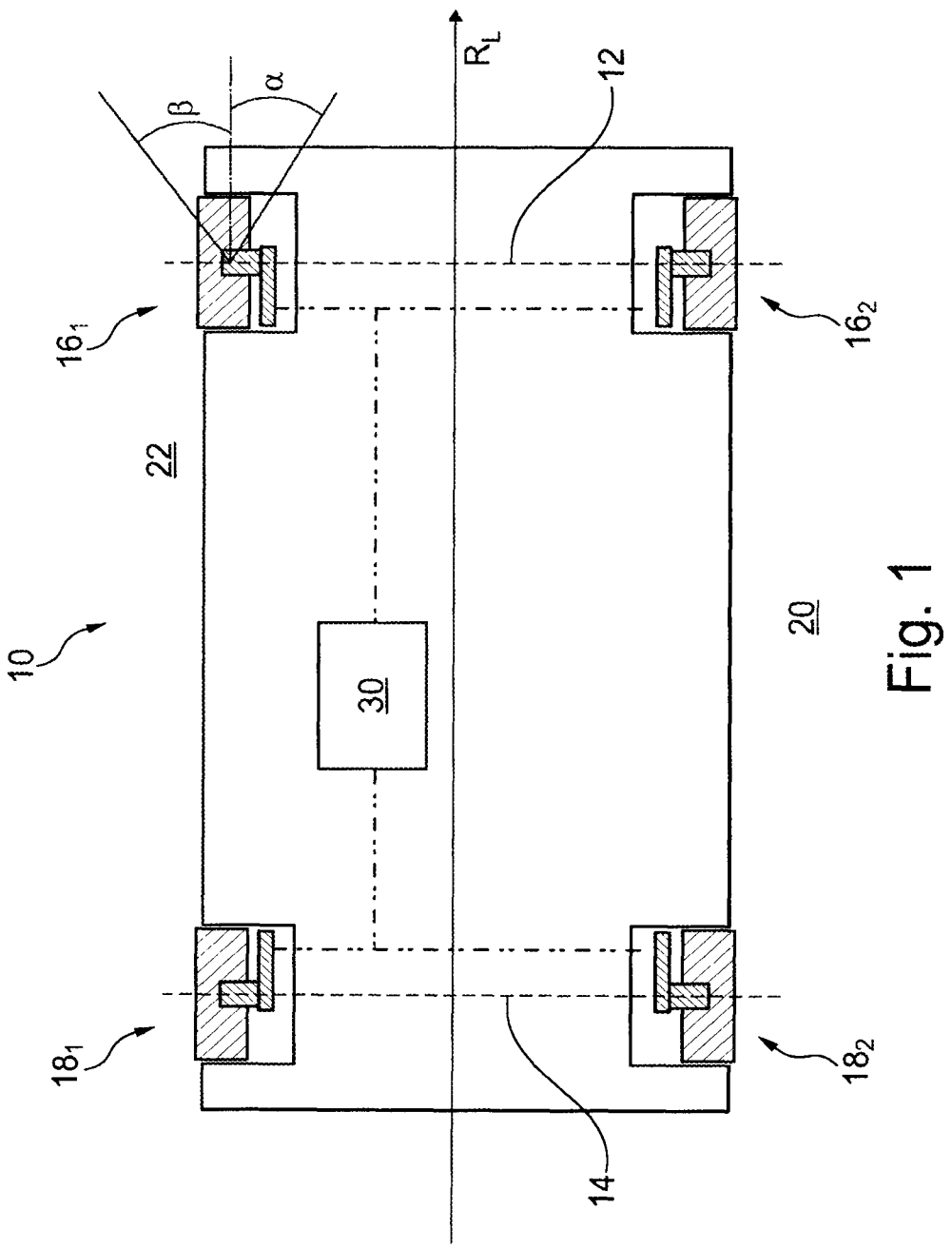
FIG. 1: shows a schematic top view of a vehicle with four drive and chassis modules.

FIG. 1 shows a schematic top view of a vehicle 10, which is preferably electrically operated, but is not discussed in more detail below. The vehicle 10 has two axles 12, 14 and two drive and chassis modules 16₁, 16₂, 18₁, 18₂ are arranged on each of the axles 12, 14, with the drive and chassis modules 16₁, 16₂, 18₁, 18₂ being arranged spaced apart from one another by a track width on each axle 12, 14. A longitudinal direction $R_L$ of the vehicle is shown and symbolized with an arrow. For the purposes of the following description, a forward travel movement of the vehicle 10 can be defined in the longitudinal direction $R_L$ and a reverse travel movement of the vehicle 10 can be defined counter to the longitudinal direction $R_L$. The drive and chassis modules 16₁, 16₂, 18₁, 18₂ are shown in a straight-ahead position, with the straight-ahead position also running in the longitudinal direction $R_L$. Proceeding from the longitudinal direction $R_L$, a first vehicle side 20 can be defined to the right of the vehicle 10 and a second vehicle side 22 can be defined to the left of the vehicle 10.

The vehicle 10 also has a control device 30, which is in a data and signal transmission connection with the drive and chassis modules $16_1$, $16_2$, $18_1$, $18_2$. A plurality of steering functions for controlling a steering angle $\alpha$, $\beta$ of the drive and chassis modules $16_1$, $16_2$, $18_1$, $18_2$ are configured and stored in the control device 30. By performing one of the steering functions, the steering angle $\alpha$, $\beta$ of each of the drive and chassis modules $16_1$, $16_2$, $18_1$, $18_2$ can be set. The steering angle $\alpha$, $\beta$ is shown as an example for all modules only on the left, front drive and chassis module $16_1$, but also applies accordingly to all modules. In this case, a steering angle $\alpha$ represents steering of the drive and chassis module $16_1$, $16_2$, $18_1$, $18_2$ to the right and a steering angle $\beta$ represents steering of the drive and chassis module $16_1$, $16_2$, $18_1$, $18_2$ to the left, each in relation to the longitudinal direction $R_L$. In the parking maneuvers explained below, all drive and chassis modules $16_1$, $16_2$, $18_1$, $18_2$ are always set by the control device 30 to synchronously assume a steering angle $\alpha$, $\beta$. Technically, however, it is also possible for the modules of an axles 12, 14 to be set to different steering angles $\alpha$, $\beta$. Furthermore, a description of the sensor system and actuator system for the physical setting of the steering angle of the drive and chassis modules $16_1$, $16_2$, $18_1$, $18_2$ is omitted here.

Figure 2:
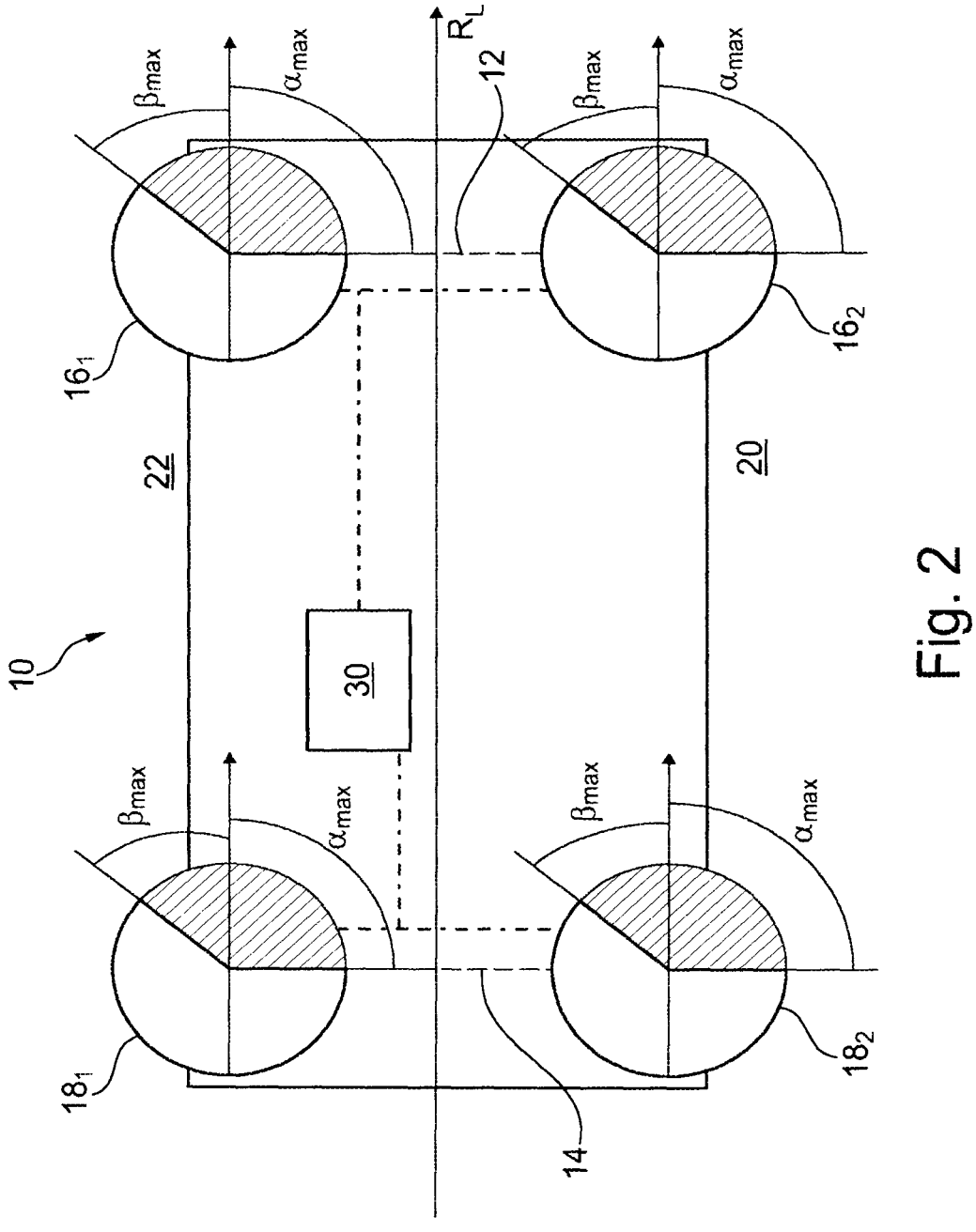
FIG. 2: shows a further schematic top view of the vehicle according to FIG. 1 with adjustable angular ranges of the drive and chassis modules.

FIG. 2 shows the vehicle 10 in a further schematic top view, although instead of the drive and chassis modules $16_1$, $16_2$, $18_1$, $18_2$ the maximum angular range is shown within which the steering angle $\alpha$, $\beta$ of the drive and chassis modules $16_1$, $16_2$, $18_1$, $18_2$ can be set. It can be seen that towards the first vehicle side 20, for example, a maximum steering angle $\alpha_{max}$ of 90° is possible, proceeding from the straight-ahead position. Towards the second vehicle side 22, for example, a maximum steering angle $\beta_{max}$ of 45° is possible, also proceeding from the straight-ahead position. A total angular range of 135° C. an therefore be set equally for all four drive and chassis modules $16_1$, $16_2$, $18_1$, $18_2$, for which the maximum possible steering angles are also the same.

Figure 3:
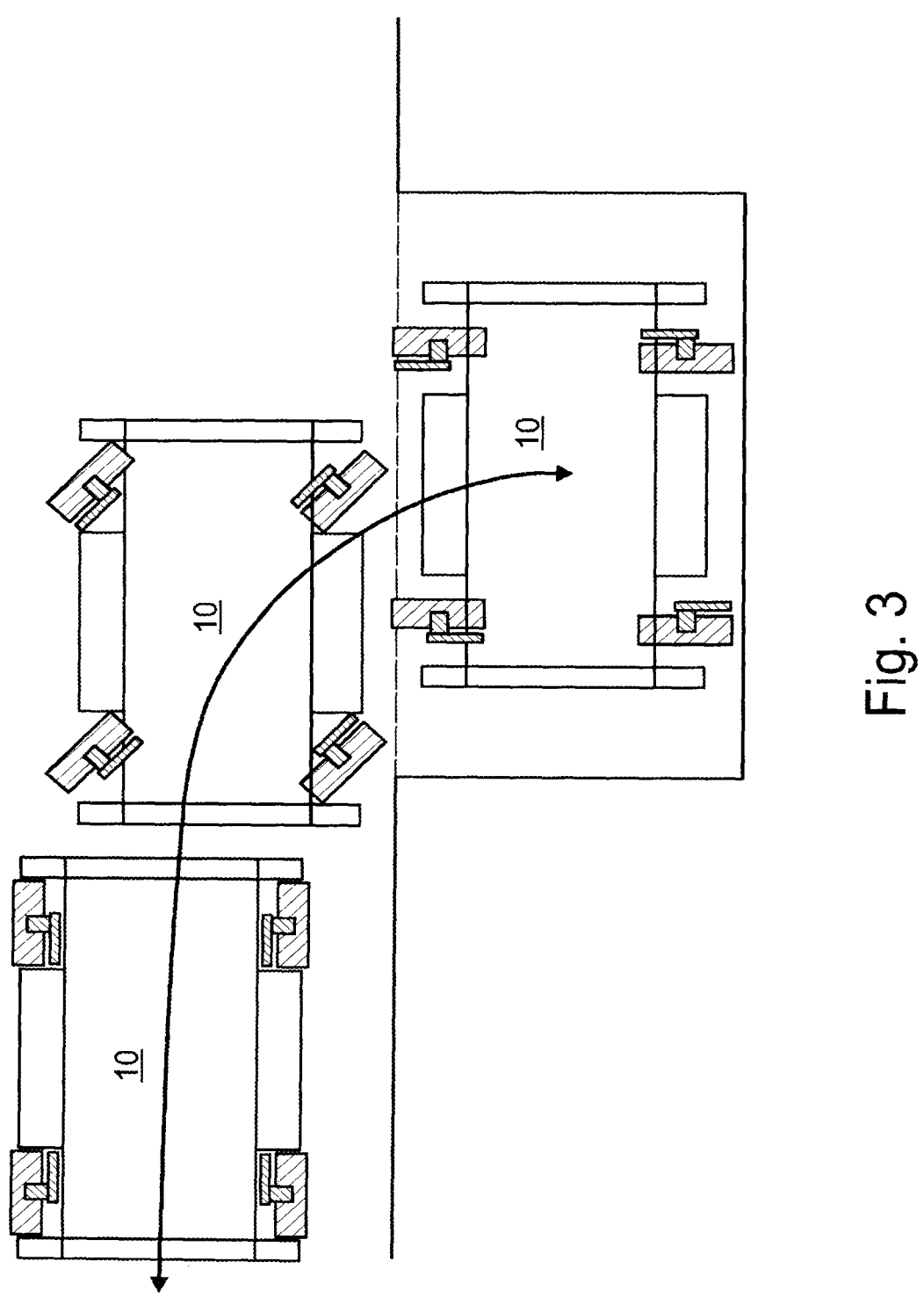
FIGS. 3 to 6: show various parking maneuvers that can be carried out with the vehicle according to FIG. 1.

FIG. 3 shows a parking maneuver in which the control device 30 the vehicle 10 sets the drive and chassis modules ($16_1$, $16_2$, $18_1$, $18_2$) between the straight-ahead position and the first maximum steering angle ($\alpha_{max}$) via one of the steering functions while the vehicle continues to move. As a result, the vehicle 10 can transition from straight-ahead travel to a crab walk, in which it largely enters the parking space until finally the vehicle 10 in the parking space covers a short distance in sideways travel. The parking maneuver shown in FIG. 3 can therefore involve parking in a parallel parking space when the vehicle 10 is moving forward. However, the parking maneuver shown can also include unparking from a parallel parking space when the vehicle 10 is reversing. The parking maneuver shown is advantageous, for example, if the parking space is at the end of a route of the vehicle 10 and the vehicle 10 continues the route in the opposite direction after leaving the parking space. It is also advantageous that during this parking maneuver it is not necessary to pivot the wheels while the vehicle 10 is at a standstill. The parking maneuver can also be used to ensure that the vehicle 10 stops briefly after unparking and then continues driving in the original direction in which it was traveling before parking. For this purpose, no correction of the steering angle $\alpha$, $\beta$ is necessary during the short standstill.

Figure 4:
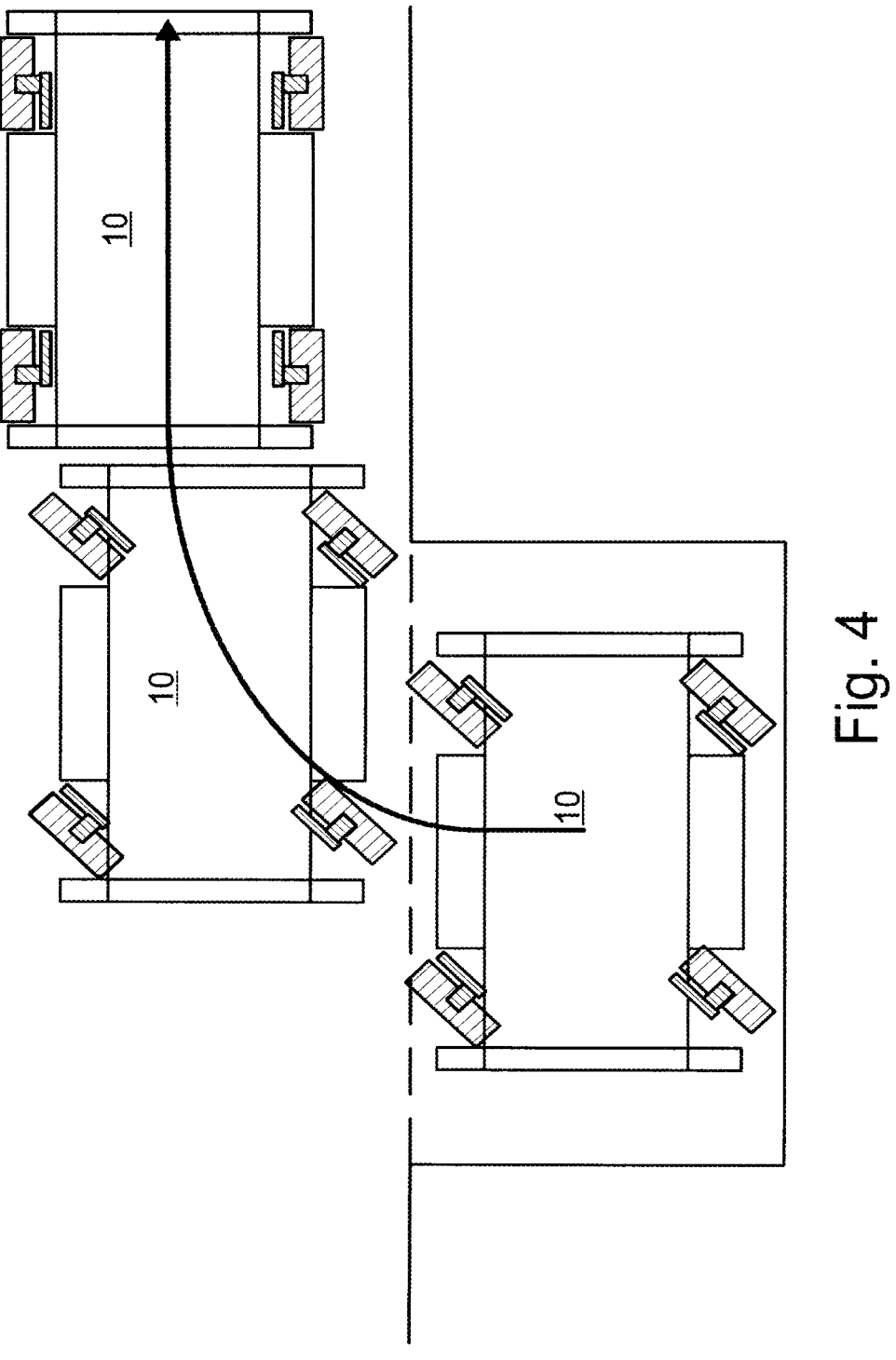

The parking maneuver shown in FIG. 4 constitutes unparking and follows on from the parking position in the parking space which is shown and described in FIG. 3. Before the vehicle 10 can begin the unparking procedure, it is necessary that the steering function moves the drive and chassis modules $16_1$, $16_2$, $18_1$, $18_2$ from the first maximum steering angle $\alpha_{max}$ of 90° to the second maximum steering angle $\beta_{max}$ of 45°. The vehicle 10 can then unpark in the crab walk before successively transitioning to straight-ahead travel by setting the steering angle $\beta$ to 0°.

Figure 5:
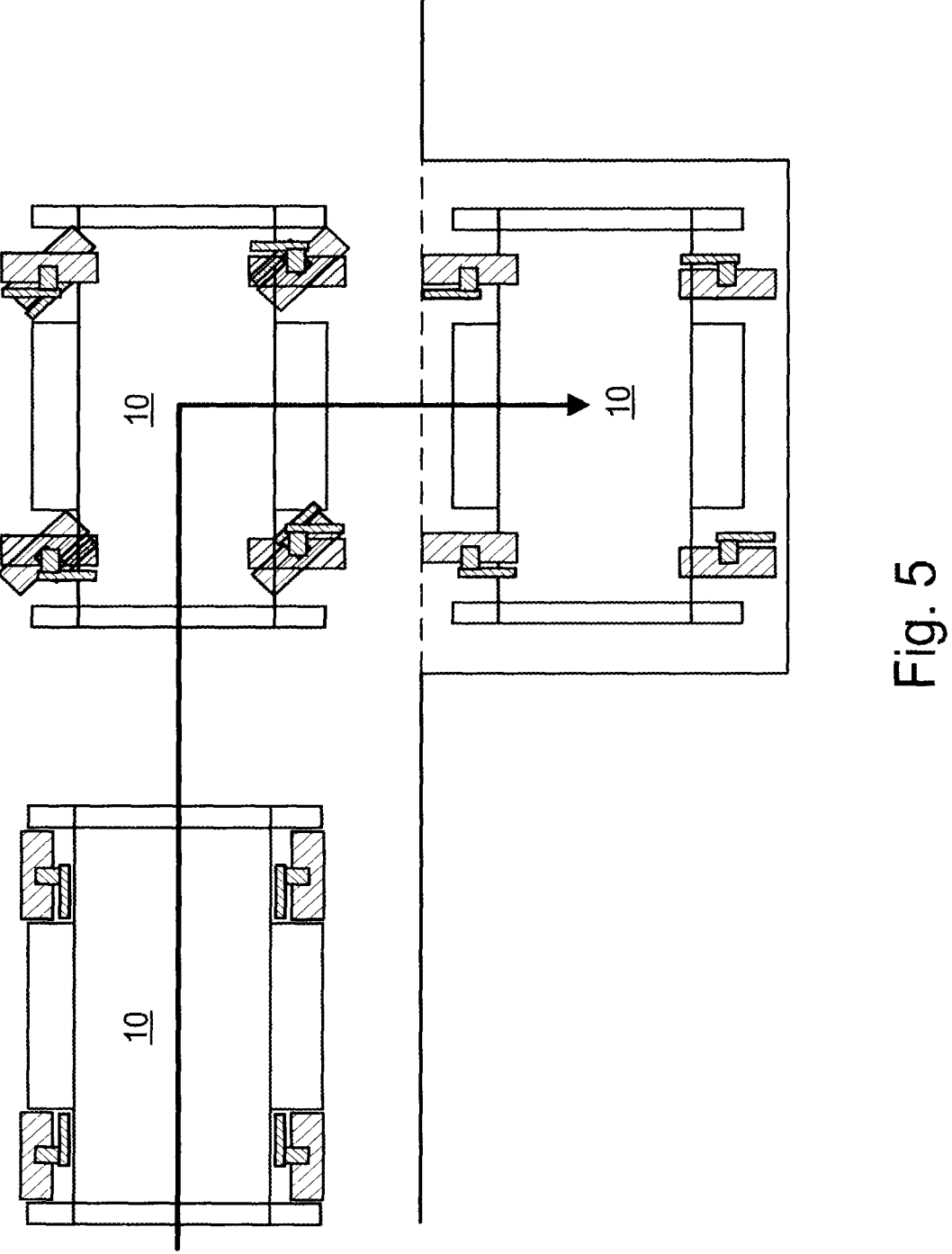

FIG. 5 shows a parking maneuver that includes parking and is suitable for particularly short parallel parking spaces compared to the length of the vehicle 10. In this case, the vehicle 10 drives straight ahead, first completely parallel to the parking space, then comes to a standstill and during this time the steering function sets the drive and chassis modules $16_1$, $16_2$, $18_1$, $18_2$ from the straight-ahead position to the first maximum steering angle $\alpha_{max}$ of 90°. After the steering angle $\alpha_{max}$ has been set, the vehicle 10 can drive sideways into the parking space.

Figure 6:
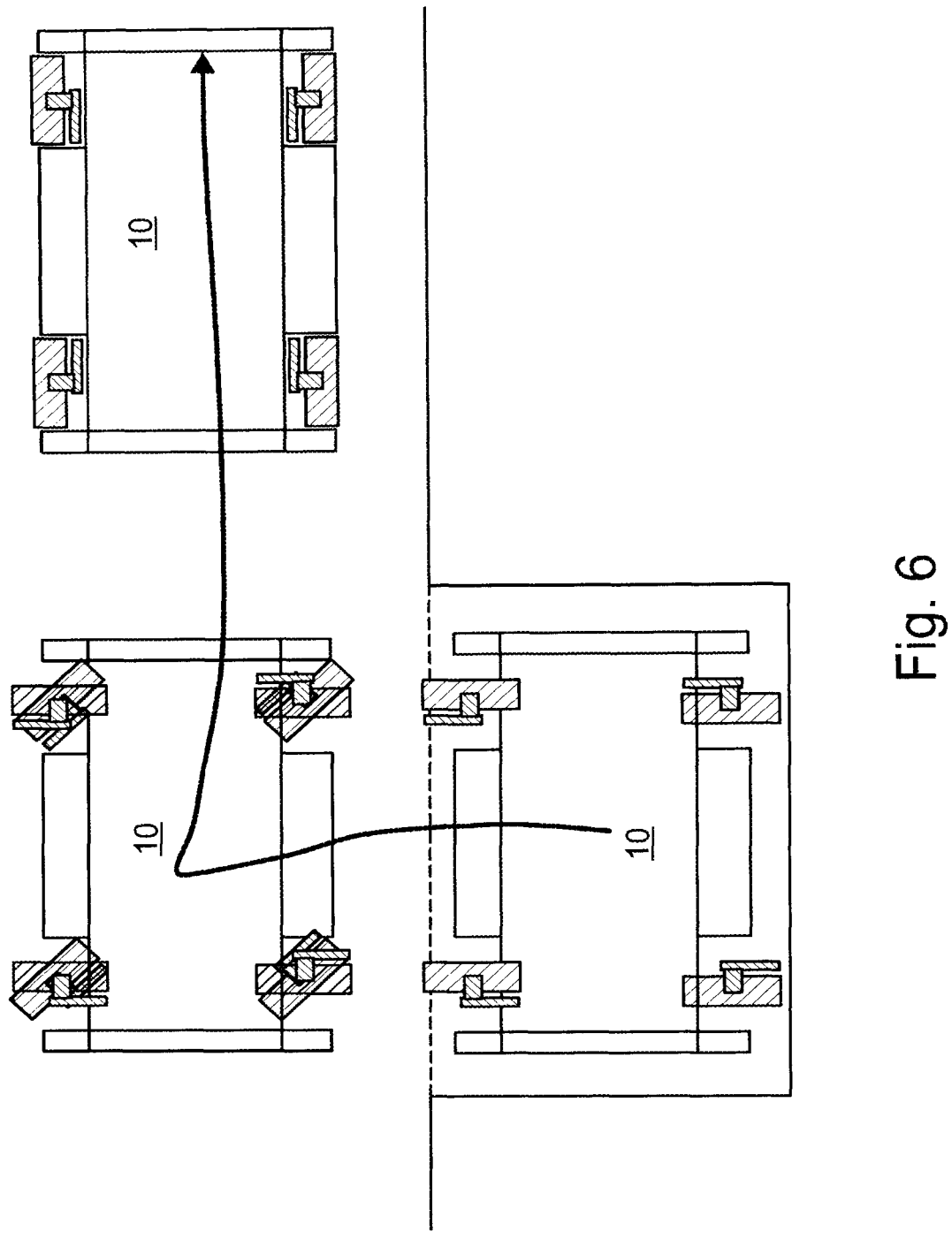

FIG. 6 shows, as a continuation of the parking maneuver of FIG. 5, unparking from a particularly short parallel parking space. In this case, the vehicle 10 first drives sideways out of the parking space, then transitions into a crab walk by setting the steering angle $\alpha$ of the drive and chassis modules $16_1$, $16_2$, $18_1$, $18_2$ in the direction of 0° in order to stop briefly when the steering angle $\alpha$ of 0° is reached and to transition to forward travel.

| List of reference signs | |
|---|---|
| 10 | Vehicle |
| 12 | First axle |
| 14 | Second axle |
| 16 | Chassis module first axle |
| 18 | Chassis module second axle |
| 20 | First vehicle side |
| 22 | Second vehicle side |
| 30 | Control device |
| $\alpha$, $\beta$ | Steering angle |
| $R_L$ | Longitudinal direction |

The invention claimed is:

1. A vehicle comprising:
   only two axles;
   for each of the two axles, two drive and chassis modules spaced apart by a track width, the two drive and chassis modules being arranged on each of the axles and each of the drive and chassis modules, proceeding from a straight-ahead position in a longitudinal direction of the vehicle, comprises a first maximum steering angle from the straight ahead position to a first vehicle side and a second maximum steering angle from the straight ahead position to a second vehicle side; and
   a control device, in which a plurality of steering functions for controlling a steering angle of the drive and chassis modules are configured and stored and which sets the steering angle of the drive and chassis modules according to a presence of an intended parking maneuver by performing one of the steering functions,
   the control device configured to, in accordance with one of the steering functions, synchronously set all four of the drive and chassis modules to a same steering angle chosen from a group consisting of:
      a steering angle between the straight ahead position and the first maximum steering angle,
      a steering angle between the straight ahead position and the second maximum steering angle,
      the first maximum steering angle, or
      the second maximum steering angle.

2. The vehicle according to claim 1, wherein the first maximum steering angle is in each case larger than the second maximum steering angle.

3. The vehicle according to claim 1, wherein an angular range between the first maximum steering angle and the second maximum steering angle is 135°.

4. The vehicle according to claim 1, wherein in the proceeding from the straight-ahead position, the first maximum steering angle is 90° and the second maximum steering angle is 45° or the first maximum steering angle is 95° and the second maximum steering angle is 40°.

5. A method for carrying out a parking maneuver with the vehicle according to claim 1, the method comprising:

synchronously setting, in accordance with one of the steering functions, all four of the drive and chassis modules to the same steering angle chosen from a group consisting of:

a steering angle between the straight ahead position and the first maximum steering angle, a steering angle between the straight ahead position and the second maximum steering angle, the first maximum steering angle, or the second maximum steering angle.

6. The method according to claim 5, further comprising setting, by the control device, the drive and chassis modules between the straight-ahead position and the first maximum steering angle via one of the steering functions while the vehicle continues to move.

7. The method according to claim 6, further comprising carrying out the parking maneuver as a parking procedure or as an unparking procedure.

8. The method according to claim 6, further comprising carrying out a parking procedure followed by an unparking procedure and, during the unparking procedure while the vehicle continues to move, setting the drive and chassis modules between the second maximum steering angle and the straight-ahead position.

9. The method according to claim 8, wherein the steering function between the parking procedure and the unparking procedure sets the drive and chassis modules from the first maximum steering angle to the second maximum steering angle.

10. The method according to claim 5, in which one of the steering functions represents the parking maneuver, the parking maneuver comprising a parking procedure and a subsequent unparking procedure, the steering function during the parking procedure setting the drive and chassis modules from the straight-ahead position to the first maximum steering angle, and then returning to the straight-ahead position.

11. A vehicle comprising:

only two axles;

four identical drive and chassis modules, each of the two axles being provided with two of the drive and chassis modules arranged thereon and spaced apart by a track width, each of the drive and chassis modules, proceeding from a straight-ahead position in a longitudinal direction of the vehicle, has a first maximum steering angle to a first vehicle side and a second maximum steering angle to a second vehicle side; and a control device programmed with a plurality of steering modes including at least a parking mode, the control device configured to instruct the drive and chassis modules to execute parking maneuvers by synchronous steering angle adjustments across the drive and chassis modules to synchronously set all four of the drive and chassis modules into the first maximum steering angle during a first of the parking maneuvers and to synchronously set all four of the drive and chassis modules into the second maximum steering angle during a second of the parking maneuvers.

12. A vehicle comprising:

only two axles;

four drive and chassis modules, each of the two axles being provided with two of the drive and chassis modules arranged thereon and spaced apart by a track width, each of the drive and chassis modules, proceeding from a straight-ahead position in a longitudinal direction of the vehicle, has a first maximum steering angle to a first vehicle side and a second maximum steering angle to a second vehicle side, the first maximum steering angle being different from the second maximum steering angle; and a control device configured to instruct the drive and chassis modules to execute parking maneuvers by an asymmetrical steering angle range for the vehicle in relation to the longitudinal direction with all of the drive and chassis modules being rotatable together to the first vehicle side up to the first maximum steering angle and all of the drive and chassis modules being rotatable together to the second vehicle side up to the second maximum steering angle.

13. The vehicle according to claim 12, wherein each of the drive and chassis modules includes a motor for driving a wheel and at least one axle control arm configured to guide the wheel relative to a vehicle frame or chassis.

14. The vehicle according to claim 12, wherein the vehicle is a non-track-bound, self-propelled land vehicle.

15. The vehicle according to claim 12, wherein the drive and chassis modules are set to synchronously assume the first maximum steering angle together and to synchronously assume the second maximum steering angle together.

16. The vehicle according to claim 12, wherein the control device is configured to instruct the drive and chassis modules to perform at least one parking maneuver by setting the drive and chassis modules between the straight-ahead position and the first maximum steering angle via a steering function while the vehicle continues to move.

17. The vehicle according to claim 16, wherein the at least one parking maneuver is a parallel parking or a parallel unparking.

18. The vehicle according to claim 16, wherein the at least one parking maneuver is a parallel parking and a parallel unparking.

19. The vehicle according to claim 18, wherein the parallel parking is performed by a forward travel movement and the parallel unparking is performed by a reverse travel movement.

20. The vehicle according to claim 18, wherein the control device is configured to synchronously set the drive and chassis modules into the first maximum steering angle during the parallel parking and to synchronously set the drive and chassis modules into the second maximum steering angle during the parallel unparking.

* * * * *